United States Patent [19]

Harris

[11] Patent Number: 4,497,714

[45] Date of Patent: * Feb. 5, 1985

[54] FUEL-WATER SEPARATOR

[75] Inventor: Robert S. Harris, Connersville, Ind.

[73] Assignee: Stant Inc., Connersville, Ind.

[ * ] Notice: The portion of the term of this patent subsequent to May 24, 2000 has been disclaimed.

[21] Appl. No.: 424,346

[22] Filed: Sep. 27, 1982

Related U.S. Application Data

[63] Continuation of Ser. No. 241,076, Mar. 6, 1981, Pat. No. 4,384,962.

[51] Int. Cl.³ ............................................. B01D 21/26
[52] U.S. Cl. .................................... 210/788; 210/114; 210/123; 210/512.1
[58] Field of Search ............... 210/788, 799, 801, 802, 210/804, 86, 114, 119, 123, 136, 187, 295, 512.1, 521, 533, 534, 259–262, 116, 416.4, 787

[56] References Cited

U.S. PATENT DOCUMENTS

| | | | |
|---|---|---|---|
| 3,144,407 | 8/1964 | Olmos | 210/307 |
| 3,187,895 | 6/1965 | Pall et al. | 210/123 |
| 3,297,160 | 1/1967 | Humbert | 210/94 |
| 3,385,440 | 5/1968 | Ray | 210/123 |
| 3,465,883 | 9/1969 | Jumper | 210/313 |
| 3,731,802 | 5/1973 | James | 210/804 |
| 3,931,011 | 1/1976 | Richards et al. | 210/136 |
| 3,996,136 | 12/1976 | Jakubek et al. | 210/804 |
| 4,017,397 | 4/1977 | Copeland | 210/238 |
| 4,053,405 | 10/1977 | Dekeyser et al. | 210/119 |
| 4,082,669 | 4/1978 | Bainbridge | 210/540 |
| 4,278,550 | 7/1981 | Watts | 210/788 |

Primary Examiner—Ivars Cintins
Attorney, Agent, or Firm—Barnes & Thornburg

[57] ABSTRACT

A fuel-water separator comprises a container having entry and exit ports and a progression of spaces through which the fuel moves. The spaces become progressively smaller and are arranged to direct the fuel through a series of downwardly and upwardly directed paths. The lower density fuel moves upwardly while the higher density water tends to move downwardly to drain through drainage openings provided in the lower portions of the spaces. Valves are provided for closing the drainage openings. The valves include float-valve balls which will release the water but hold the fuel. One of the spaces in the container includes a media having a downwardly directed surface upon which the water coalesces to move downwardly and through which the fuel moves to progress to the next space. Another one of the spaces includes a media providing a surface tension-discriminating surface through which the fuel will move and down which the separated water will move. The fuel entering the separator may move first through a generally circular passageway having a radially outer wall with openings through which the water is separated by centrifugal force.

5 Claims, 8 Drawing Figures

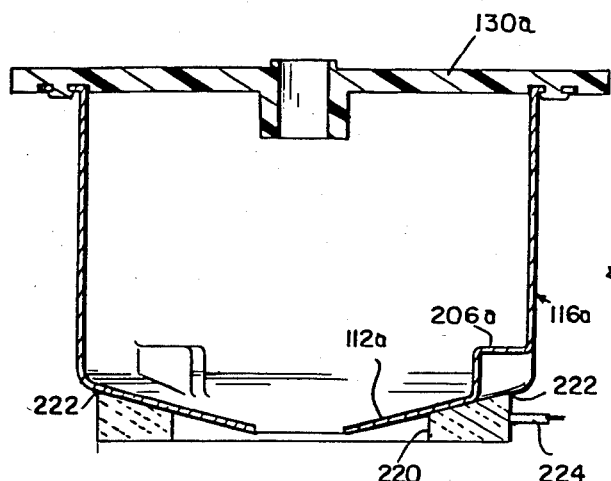
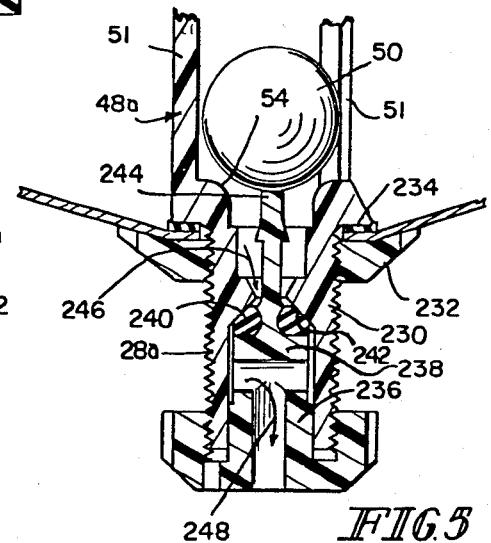
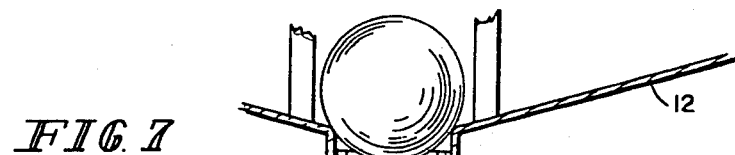
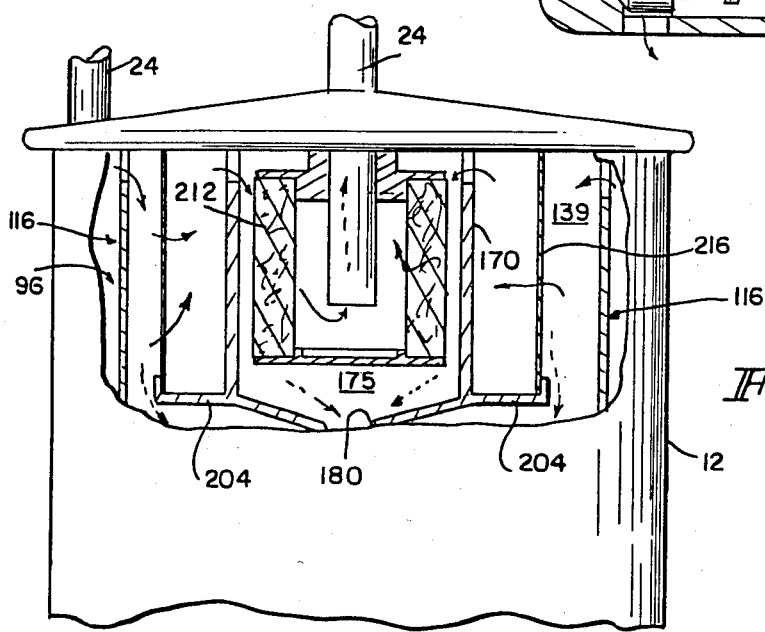

FUEL-WATER SEPARATOR

This is a continuation application under Rule 60, of pending prior application Ser. No. 241,076 filed on Mar. 6, 1981, now U.S. Pat. No. 4,384,962.

The present invention relates to fuel-water separators, and particularly to a separator for use in diesel-engine applications to separate water from the diesel fuel.

It is known that diesel fuel contains rather substantial amounts of water which will damage the fuel-injection systems of the engines, if it is not removed. Many fuel-water separators and filters have been suggested, for instance, in U.S. Pat. Nos. 4,010,101; 4,017,397; 3,144,407; 3,187,895; 3,237,769; 3,273,716; 3,297,160; 3,335,866; 3,465,883; 3,550,776; 3,768,659; and 3,931,011.

There are a number of quite old patent references which disclose various filter-separators as follows: U.S. Pat. Nos. 1,054,702; 1,160,653; 1,364,435; 1,372,828; 1,431,411; 1,468,906; 1,477,947; 1,536,802; 1,623,437; 1,630,287; 1,630,504; 1,632,461; 2,170,247; 2,230,408; 2,326,691; 2,415,246; 2,424,932; 2,503,566; 2,656,926; 2,781,909; and 3,012,675. All of these patent references point clearly to a problem which has been recognized for years and years but which has not been solved.

The present invention constitutes an improvement over these prior art separators. The separator of the present invention does not include a disposable filter like many prior separators. The present separator is designed so that filtering of dirt, rust, debris, etc., can occur at some other point in the system and so that it functions to separate the water from the fuel in a safe and reliable manner. The separator operates without servicing except to drain the excess water, provides an indication when water is to be drained, and operates without priming with fuel after the water is drained. The present separator is enclosed in a metal container and crimped or otherwise sealed closed so that it becomes an inexpensive disposable unit if it malfunctions or needs replacing. The inner components of the separator are fabricated from molded plastic parts so that the unit is lightweight, durable, and inexpensive.

Water has different chemical properties than the fuel. Water, by definition, is hydrophillic, whereas the fuel is hydrophobic. Because of this, water and fuel are generally immiscible. Water also has a greater density than the fuel, and therefore has a higher specific gravity than the fuel. Further, water exhibits different surface tension properties than fuel.

The separator of the present invention utilizes a combination of water separating and settling techniques arranged in a unique fashion to provide effective water separation. The fuel may be initially introduced into the separator through an entry port and directed about a circular passageway at a relatively high velocity to apply centrifugal force to the fuel. The centrifugal force separates the higher density water from the lower density fuel. The radially outer wall of the passageway is provided with openings through which the separated water moves to drain downwardly to the bottom of the container.

Fuel moves through a progression of spaces through which the fuel moves upwardly and then downwardly. Because of its higher density, the water tends to move downwardly and stay downwardly while the lighter density fuel tends to move upwardly in the spaces.

In one of the spaces, a media is provided having a downwardly directed surface upon which the water coalesces to move downwardly and through which the fuel moves to progress to the next space. This media may be, for instance, an untreated fiberglass sleeve. In another space, a media is providing having a surface tension-discriminating surface through which the fuel will move and down which the separated water will move. The surface tension-discriminator may be fabricated from, for instance, a polyester cloth material.

In the illustrative embodiment, the spaces are defined by the outer container, an outer cup, and an inner cup. The container has a drainage opening at its bottom, and a petcock is provided for closing the drainage opening to control removal of separated water from the container. As a safety feature, a float valve ball having a density greater than that of the fuel and less than that of the water is seated in the drainage opening. When water is present, the valve ball floats above its seat in the drainage opening to allow the water to flow therethrough. When the water has been drained, the valve ball drops downwardly and seats in the drainage opening to stop the flow of liquid so that fuel does not drain if the petcock is inadvertently left open.

In a somewhat similar fashion, the outer cup is also provided with a drainage opening. Such drainage opening is closed by a valve ball which floats upwardly in water to permit drainage from the outer cup and which seats in the opening to prevent drainage of fuel from the outer cup after the water has drained. This valve ball is preferably arranged to float upwardly in the presence of excess water in the bottom of the container to close off a drainage opening in the inner cup. This valve ball further functions to hold fuel in the last stages of the separator so that enough fuel is present to start the engine without the need to prime the system or refill the separator as required with present filter systems.

Various other features and advantages of the present invention will become apparent in view of the following detailed description of various embodiments thereof, which description should be considered in conjunction with the accompanying drawings, in which:

FIG. 4 is a sectional view of a portion of the separator of FIGS. 1-3 embodying an electric heating element;

FIG. 5 is a sectional view of a portion of the apparatus of FIGS. 1-3 embodying a plastic draincock for the container;

FIG. 6 is a sectional view of a portion of the separator of FIGS. 1-3 embodying a water level probe;

FIG. 7 is a sectional view of a portion of the separator of FIGS. 1-3 embodying another drain valve for the container; and FIG. 8 is a diagrammatical view, partly cross-sectioned and broken away, of another embodiment of the separator of the present invention.

Figure 1:
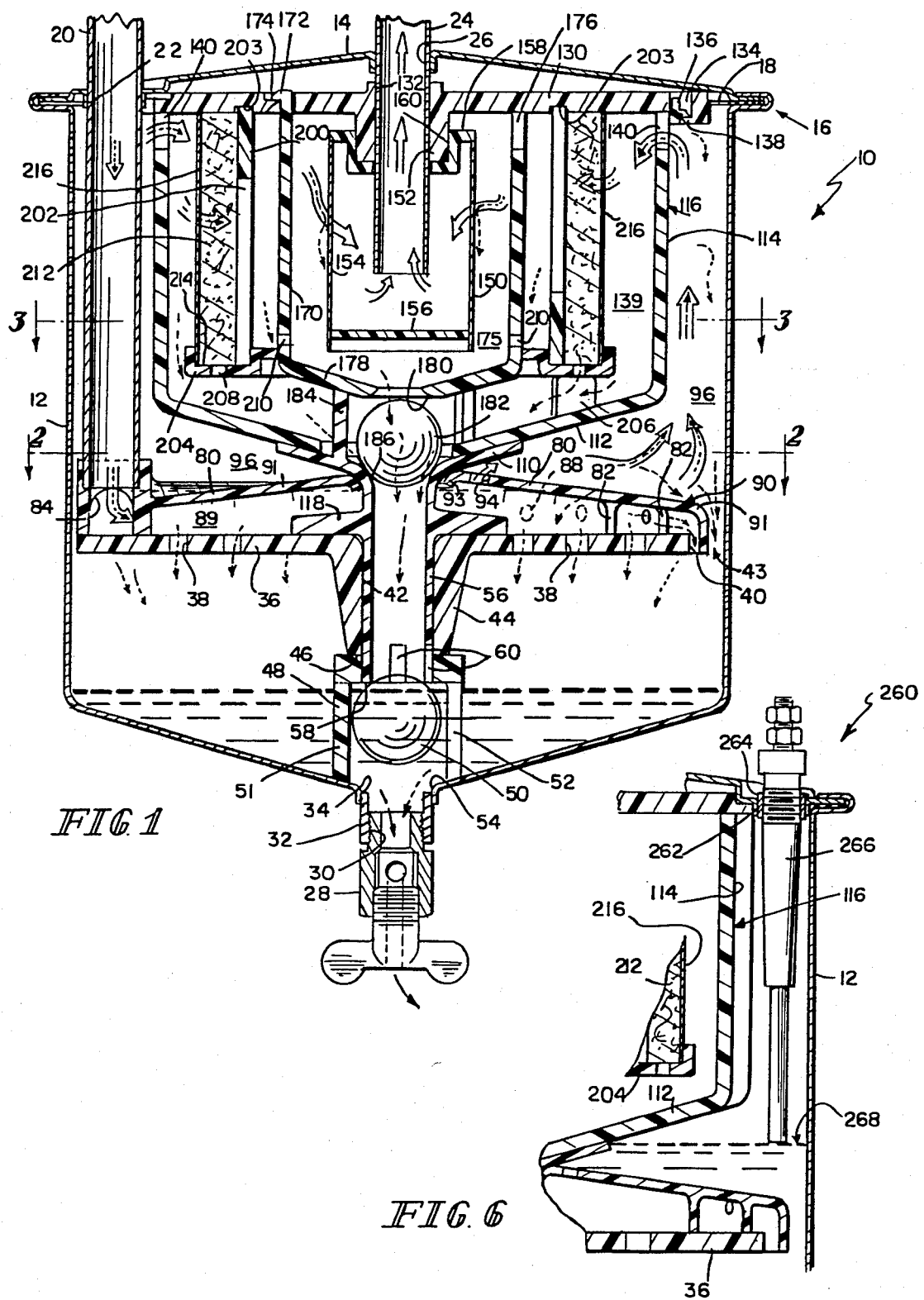
FIG. 1 is a full sectional view of a separator embodying the features of the present invention taken generally along the axis of the container.

Referring to the drawings, FIG. 1 shows the fuel-water separator of the present invention, comprising an upright cylindrical housing 10 having a lower can or can portion 12 and an upper cover or cover portion 14 joined together by crimping as indicated at 16 with a gasket 18 captured in the crimp joint to provide a seal between the cover 14 and can 12. Fuel enters the separator 10 through a tube 20 which is brazed to an entry port 22 in the cover 14. The fuel exits through a tube 24 which is brazed into a central exit port 26 in the cover 14.

A central opening 34 is formed at the bottom of the can portion 12 of the housing 10 to provide a drainage port for water accumulated at the bottom of the can 12. A petcock 28 is threaded, as indicated at 30, into a threaded tube 32 brazed into the central opening 34. By opening and closing petcock 28, drainage of the water from can 12 can be controlled.

Inside the housing 10 is a circular plate 36 having a plurality of holes or openings 38 and an outer peripheral edge 40. The diameter of the plate 36 is less than the diameter of the can 12 so that a circumferential space 43 is provided between the outer peripheral edge 40 of the plate 36 and the can 12 for channeling water to the bottom of the can 12.

The plate 36 is provided with an opening 42 concentric with a downwardly extending sleeve 44. The lower edge 46 of the sleeve 44 rests upon a retainer 48 for a ball 50. This ball 50 can move upwardly and downwardly in the retainer 48 in a space defined by peripherally spaced-apart, vertically extending legs 51. Legs 51 define a plurality of drainage spaces 52 therebetween. The ball 50 rests upon a seat 54 formed at the bottom central opening 34 of the can 12.

A drainage tube 56 extends downwardly through the opening 42 in sleeve 44. The lower end 58 of tube 56 provides an upper stop for the ball 50. The lower end 58 includes a plurality of reliefs or notches 60 which provide drainage relief and which prevent the ball 50 from sealing off the bottom of the tube 56.

Mounted on or connected to the top of the plate 36 is a semicircular fuel passageway or raceway 80 which may have a cross-sectional inverted U-shape, as best indicated at 82 in FIG. 1. This passageway 80 is designed to apply a centrifugal force to the fuel-water mixture passing therethrough. The fuel enters the passageway 80 as indicated at 84 from the tube 20 and moves clockwise (FIG. 2) through the passageway 80 as indicated by the arrow 86. About the last one-third of the radially outer peripheral wall of the passageway 80 is provided with openings 88. The centrifugal force involved in the flow of the fuel-water liquid mixture through the passageway 80 pushes the higher density water to the outer wall so that the water is separated from the fuel forced through the openings 88, and drains downwardly over the outer peripheral edge 40 of the plate 36 through the space 43 between the edge 40 and the can 12. Once water is separated from the fuel, it tends to drain away and not to mix with the fuel. The fuel-water mixture continues to move through the passageway 80 and exits through end 92.

Figure 2:
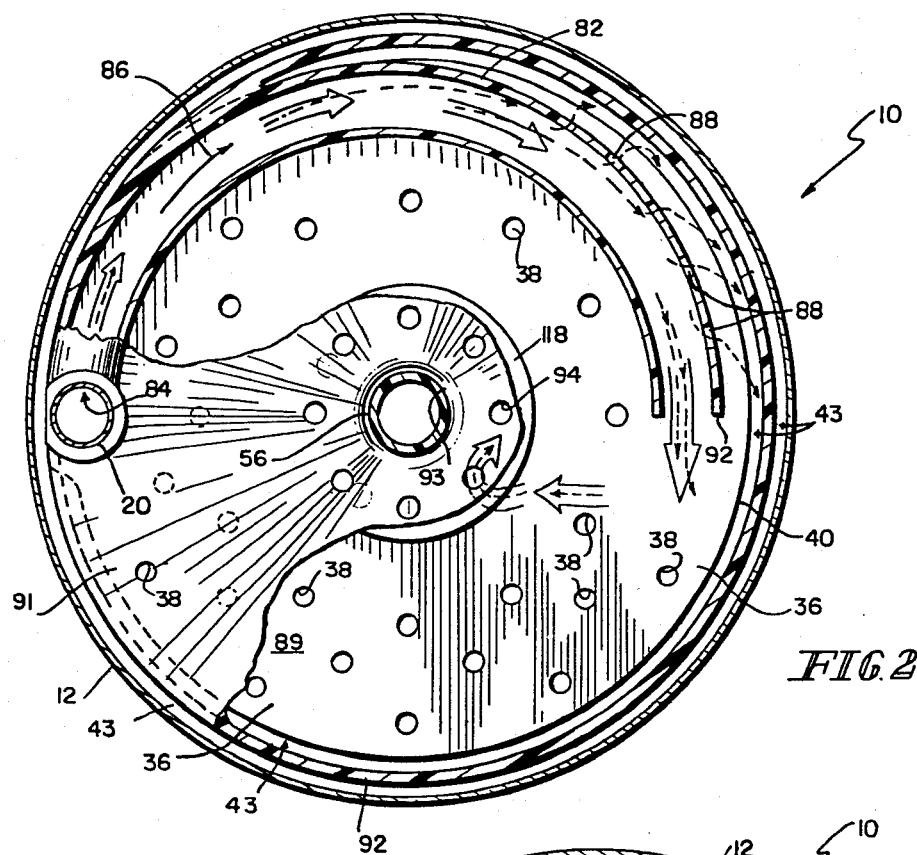
FIG. 2 is a sectional view, partly broken away, of the separator shown in FIG. 1 taken generally along section lines 2—2 in FIG. 1.

Referring to FIGS. 1 and 2, the plate 36 and passageway 80 provide a centrifugal section 89 of the separator 10 which is isolated by an upper cover 90. The centrifugal section 89 is also formed in part by circular flange portion 118 of the tube 56 which provides support for the connection between the tube 56 and the sleeve 44 of the plate 36. Cover 90 is generally circular in shape and includes a gradually downwardly sloping upper wall 91 which extends radially outwardly slightly beyond the outer peripheral edge 40 of the plate 36 and a downwardly extending peripheral skirt 92. Skirt 92 extends far enough downwardly so that its end is at least even with the bottom surface of the plate 36, and it serves to deflect water separated by the centrifugal action downwardly into the bottom of the can 12.

The upper wall 91 of the cover 90 includes a central opening 93 for receiving the drainage tube 56. The upper wall 91 further includes a plurality of smaller openings 94 formed around and in proximity to the larger central opening 93. Openings 94 provide exits for the fuel-water mixture after it has passed through passageway 80. The liquid mixture passes through the openings 94 and moves into a first space 96 above the cover 90. Separated water, which is still entrained in the liquid mixture after the centrifugal action, may fall by gravity along the downwardly sloping upper wall 91 of the cover 90 and over the skirt 92 into the bottom of the can 12.

The first space 96 into which the liquid moves after leaving the centrifugal section 89 is illustratively defined by the upper wall 91 of the cover 90, conical flange portion 110 of the tube 56, as well as by the bottom 112 and side 114 of an outer cup 116. The space 96 is also, as shown in FIG. 1, defined by the inner surface of the can 12. It will be seen that the conical flange 110 provides a seat or support for the rather shallow conically shaped bottom 112 of the cup 116.

A mounting and support plate 130 is provided at the upper end of the assembly 10, just under the cover 14. This circular plate 130 has a central opening 132 through which the exit tube 24 extends. A plurality of mounting openings 134 are peripherally spaced about the radially outer peripheral edge of the plate 130, and snap fingers 136 provided on the outer cup 116 extend into these openings 134 to make a snap connection between the cup 116 and the plate 130 as indicated at 138. This is only one of several ways the cup 116 can be connected to the mounting plate 130.

The plate 130 and the cup 116 define a second space 139 within the cup 116, and the liquid mixture flows into that space 139 through a plurality of openings 140 peripherally spaced about the upper edge of the cup 116.

A surface tension separator 150, to be described in more detail hereinafter, is pressed upon a downwardly extending central shoulder 152 on the plate 130 which defines the opening 132 through which the exit tube 24 extends. This separator 150 is a generally cylindrical separator having an outer cylindrical wall 154, a lower end 156, and an upper end 158 provided with a socket portion 160 receiving the shoulder 152.

An inner cup 170 is provided over the surface tension separator 150. The illustrative inner cup 170 is concentrically connected to the plate 130 by snap fingers 172 which engage openings 174 peripherally spaced about the plate 130. This inner cup 170 defines a third space 175. The third space 175 also has a plurality of openings 176 peripherally spaced about its upper edge for movement of the liquid mixture into the inner cup 170, and a plurality of openings 210 peripherally spaced about its bottom 178 for movement of water toward the bottom of can 12. The shallow conical bottom 178 of the cup 170 is provided with a concentric opening 180 forming an upper seat for a ball 182 captured in a ball retainer defined by a plurality of peripherally spaced-apart fingers 184 extending upwardly from the flange portion 110 of the drainage tube 56. The drainage tube 56 is formed to provide a lower seat 186 for the ball 182 with the seat 186 being below and concentric with the upper seat 180. The ball 182, therefore, can move between the upper seat 180 and the lower seat 186 in the vertical space defined by the fingers 184.

Mounted concentrically about the inner cup 170 is a support cage 200 providing a plurality of peripherally spaced-apart, axially extending openings 202. This cage 200 is illustratively connected to the plate 130 by being engaged in a peripherally extending slot 203. The bottom edge of the cage 200 is supported in a circular, channel-like retainer 204 which, in turn, is supported by a plurality of studs 206 extending upwardly from the bottom 112 of the outer cup 116. This retainer ring 204 has a plurality of peripherally spaced-apart openings 208 in the bottom web portion of the channel. The radially inner peripheral edge of ring 204 engages the outer peripheral surface of the inner cup 170 just below the openings 210 in the cup 170. A sleeve 212 of untreated fiberglass media is placed on the cage 200 and supported by the channel 214 in the retainer ring 204. Another surface tension separator 216, to be described in more detail hereinafter, is provided around the outer periphery of the sleeve 212.

In the illustrative embodiment, the surface tension separators 150, 216 separate fine water particles having a diameter of about 130–140 microns from the liquid mixture. These are water particles which are too small to be separated by centrifugal or gravity action. The separator media may be either a monofilament polyester fiber woven into a cloth having a pore size of about 130–140 microns or a monofilament Teflon ® screen having a similar pore size with approximately 100 fibers both horizontally and vertically per inch, i.e., 10,000 fibers/square inch. Each of these separator media will separate water particles of the diameter indicated and pass fuel in response to widely varying surface tensions between the two liquids. The separated water will flow down the outer surface of the separator media.

Further, in the illustrative embodiment, sleeve 212 is a mat of untreated random length fiberglass fibers, comercially referred to as Class 5A fiberglass.

Preferably, all of the elements of the separator housed within the can 12 are constructed of materials which will collapse or crush so that an impact which deforms the can 12 will not cause the internal elements of the separator to pierce the can 12. This feature prevents leakage of the can 12 if it should be deformed by an impact. Since all connections to and from the housing 10 are at the top or bottom, there are no seals on the sides of the can 12 which could break upon impact. Furthermore, the crimp 16 is a roll seam which will deform slightly without leaking. These features are intended to prevent hazardous fuel leakage if the housing 10 is deformed.

Diesel fuel, which often contains some water, enters the entry tube 20 and moves downwardly to the point 84 at which the fuel-water mixture enters the passageway 80. Movement of the fuel-water mixture through the passageway 80 imparts a centifugal force on the mixture. Because the water is of higher density than the diesel fuel, some of the water will start to separate by moving to the outer wall of the passageway 80 and exit through the openings 88. The separated water moves through space 43 and falls to the bottom of the can 12. The fuel leaves the rather tight confines of the passageway 80 in which it is moving at a relatively high speed into the centrifugal section 89 beneath the cover 90 such that its velocity is drastically reduced. This reduction of the velocity causes separated water entrained in the liquid mixture to move downwardly against the plate 36 and out through the openings 38 in the plate 36. As the heavier water moves downwardly through the openings 38, it will displace the lighter weight oil and force it upwardly through the openings 94 in the upper wall 91 of the cover 90 into the relatively larger first space 96 in the upper portion of the can 12. Separated water still entrained in the mixture after passing through openings 94 may run along the outer surface of the upper wall 91 of the cover 90 and fall by gravity to the the bottom of the can 12.

The first space 96, at this stage in the separation, provides residence time for the fuel-water mixture so that the water separated from the mixture by the centrifugal force can drain downwardly through space 43. The residence time itself will provide additional separation because of the difference in specific gravity between the water and the oil.

In the space 96, i.e., outside the outer cup 116, the oil will tend to move upwardly and the water will tend to move downwardly. The only communication between the space 96, outside the outer cup 116, and the inside of the cup 116 is through the openings 140 at the upper peripheral edge of the cup 116. It is contemplated that oil with less water in it will be at the upper peripheral edge of the outer cup 116 to move through the openings 140 into the second space 139 between the outer cup 116 and the fiberglass media sleeve 212. Finely particulated or emulsified water particles will pass through the surface tension spearator 216, coalesce, and form larger particles of water along the strands throughout the fiberglass sleeve 212. The larger water particles will tend to run downwardly and through the strands of the sleeve 212. The surface tension separator 216 prevents larger water particles which do not require coalescing from overloading the fiberglass strands of the sleeve 212. It is known that a fuel oil and water mixture will act in this manner with the finely particulated water coalescing on and moving down the fiberglass strands. The fuel oil itself will penetrate through the fiberglass and move radially inwardly through the passages 202 in the cage 200. Further, separated water particles will pass through openings 210 and drain through opening 180 in the inner cup 170.

The water that separates or coalesces off the fiberglass strands of the sleeve 212 will move downwardly through openings 205 and displace the ball 182 upwardly to allow water to move downwardly through the drainage tube 56. The ball 182 is selected to have a density less than that of water and greater than that of diesel fuel. When the water level in the housing 12 gets up to the point that the ball 182 is supported by the water, the ball 182 will rise against the upper seat 180 to prevent any back flow upwardly into the inner cup 170.

Looking at the drainage function through the petcock 28 and noting the function of the ball 50, the ball 50 also has a density greater than that of diesel fuel and less than that of water. When the lower portion of the housing 10 contains water, the ball will float upwardly, allowing drainage out through the petcock 28. Even if the petcock 28 is left open, once the water is drained out of the housing 10, the ball 50, because it is heavier than the oil, will move downwardly to close off the opening 34. This ball 50, therefore, constitutes a safety check valve to prevent drainage of oil out of the can 12 if the petcock 28 is inadvertently left open too long.

When the water drains out of the outer cup 116 past the ball 182 and through the drainage tube 56, the ball 182 will seat on the lower seat 186 to close off the drainage tube 56 to prevent drainage of oil out of the cup 116. This feature eliminates the need to refill the cup 116 with fuel before the engine can be started. The engine can run on the fuel trapped in the inner cup 170 until the fuel pump starts pumping fuel through the separator.

The fuel-water mixture that moves through the fiberglass sleeve 212 will move against the outer surface of the inner cup 170. There again, the coalesced particles of water will tend to move downwardly to exit out through the openings 208 in the retainer ring 204. At higher flow rates, some coalesced particles of water may be carried by the fuel through the sleeve 212. The fuel will move upwardly through the spaces 176 about the upper edge of the inner cup 170, and the coalesced water will move downwardly through openings 210 into the inner cup 170. The fuel entering the inner cup 170 through spaces 176 should not have any heavy particulate water left. However, if finer water particles are in the fuel, those particles will separate at the face of the outer surface of the surface tension separator 150 and move downwardly through the central opening 180 in the bottom of the cup 170.

As previously described, the separator 150 may be fabricated by molding a polyester fabric outer cylindrical wall to the lower and upper end walls 156, 158. This polyester fabric is known to separate fuel and water by the widely varying surface tensions between the two liquids. The oil will move through the fabric to the interior of the separator, and the water particles will move downwardly on the outside of the fabric. The water-free fuel will leave the separator 150 and exit the assembly 10 upwardly through the exit tube 24.

Referring to FIG. 4, it will be seen that a metal outer cup 116a is shown having a bottom 112a and a shoulder 206a that serves the same function as the stud 206 in FIG. 1. A plate 130a provides a mounting plate for the same purpose as the plate 130 in FIG. 1. The illustrative outer cup 116a in FIG. 4 is metal so that it can be heated with a heating element 220. The illustrative heating element 220 is an annular ceramic ring which may be brazed or soldered to the bottom 112a of the cup 116a. This type of heating element 220, commonly referred to as a PTC Element, is well known and, generally speaking, includes an annular ceramic heating element which is metalized on its outer surface so that it can be soldered or brazed to an item to be heated. An electrical service wire is indicated at 224.

The embodiment of FIG. 4, therefore, comprises a heating element 220 built into the basic water separator to heat the outer cup 116a and in turn to heat the fuel to prevent the water from freezing and to prevent the fuel from becoming gell-like due to paraffin in the fuel. It will be appreciated that automatic thermostat means may be embodied for applying current to the heater 220 as required to obtain the desired fuel and water condition.

Referring to FIG. 5, it will be seen that an alternative petcock 28a is shown. In the FIG. 5 structure, the ball retainer 48a is provided with the vertically extending legs 51 for retaining the ball 50. The retainer 48a is molded to provide the seat 54. The retainer 48a is also molded to provide a downwardly extending threaded sleeve 230. The retainer 48a is attached to the bottom of the housing by means of a compression nut 232 which captures a gasket 234 as illustrated. The petcock 28a includes a handle 236 threaded on the sleeve 230. The handle 236 has a stem 238 extending upwardly through the opening in the sleeve 230 to carry an O-ring 240 to seal against a seat 242 formed within the sleeve 230. In the illustrative embodiment, the stem 238 includes an upwardly projecting tip 244 which forces the ball 50 off the seat 54 when the petcock is closed. The projecting tip 244 prevents the weight of the fuel-water mixture from forcing the ball 50 into engagement with seat 54 when the separator is filled with fresh fuel. Without the tip 244, the weight of the fresh fuel would prevent the desired floating action of the ball and thereby prevent drainage of the separator. When it is desired to drain the can 12, the handle 236 is rotated to lower the O-ring 240 away from the seat 242 so that the liquid can drain as indicated by the arrows 246, 248 down through the petcock 28a.

Figure 3:
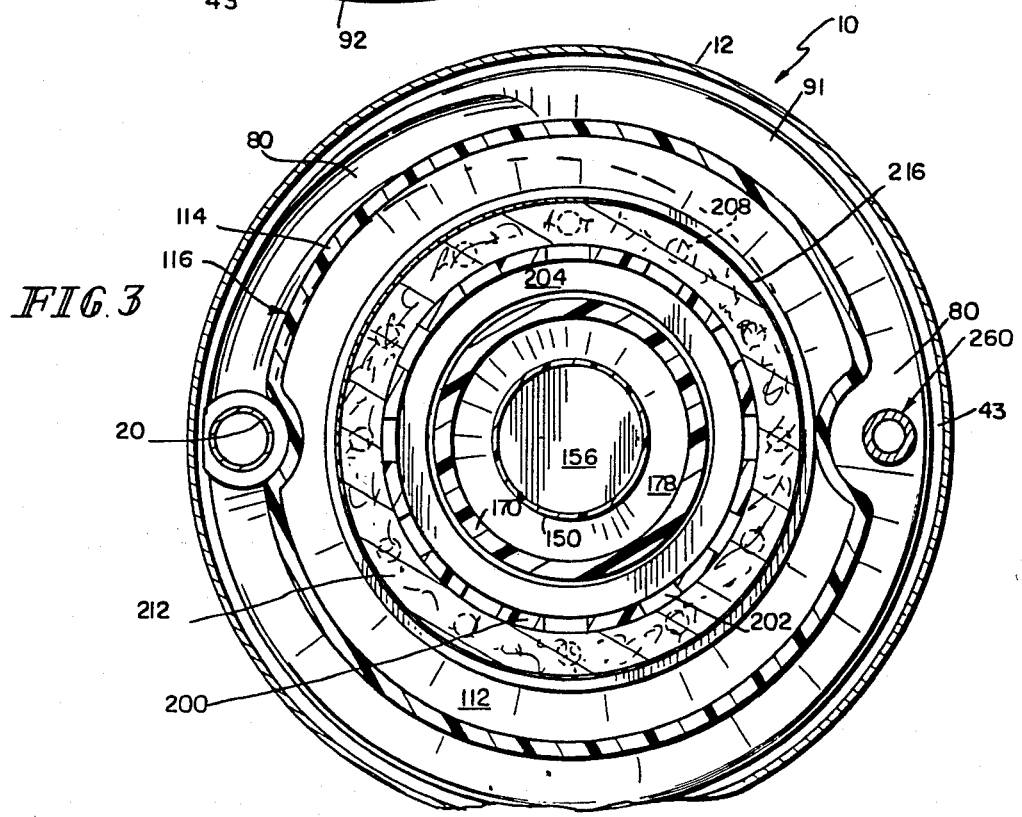
FIG. 3 is a sectional view of the separator shown in FIGS. 1 and 2 taken generally along section lines 3—3 in FIG. 1.

One embodiment of the invention may include a water sensor probe 260, as best seen in FIGS. 3 and 6. If a water sensor probe is desired, the upper cover 14 may be provided with an opening 262 (FIG. 6) for receiving a threaded sleeve 264. The probe 266 itself may be a commercially available liquid level probe adapted to either capacitive or resistive circuitry to sense water in the bottom of the housing 12. The probe 266, as illustrated, may be threaded downwardly into the sleeve 264 to extend downwardly to the level indicated, for instance, at 268. The liquid level probe, of course, may be hooked to a light indicator on the dashboard of the vehicle or, for instance, to a solenoid valve drive as illustrated in FIG. 7.

In FIG. 7, a petcock indicated at 28b is shown threaded into the sleeve 32. A solenoid-operated petcock valve member 280 is actuated to pull a plunger 282 from a seat 284 to drain the can 12. The valve member 280 is electrically connected to a power supply source (not shown) by wires 286. A switch (not shown), actuable by either the driver of the vehicle or the liquid level probe 266, may be connected in series with the valve member 280 for controlling its operation. It will also be understood that valve member 280 may be either pneumatically or hydraulically controlled without departing from the scope of the present invention.

Referring to FIG. 8, sleeve 212 of untreated fiberglass media may be located within the inner cup 170, either replacing or being used in conjunction with the surface tension separator 150. In this embodiment, the sleeve 212 and wall 200 in the outer cup 116 are removed, leaving only the surface tension separator 216 retained by the channel-like retainer 204. In operation, fine water particles are removed by the separator media 216 in the outer cup 116. The separated water will flow down the outer surface of the separator media 216, as indicated by the broken arrow in FIG. 8. Any finely particulated or emulsified water particles which pass through the separator 216 will coalesce and form larger particles of water along the strands throughout the fiberglass sleeve 212 in the inner cup 170. The larger water particles will tend to run downwardly and through the strands of the sleeve 212 and drain through opening 180 in the inner cup 170.

What is claimed is:

1. A fuel-water separator, comprising a container having fuel entry port means, fuel exit port means, a lower portion having a drain opening, means for separating water from the fuel inside said container and causing the water to move downwardly while the low density fuel moves upwardly, a first valve means inside said container for preventing the separated water from remixing with the fuel, said first valve means including an opening through which separated water drains downwardly and float means for closing said opening when the water collected raises to said opening, and second valve means for closing said drain opening, said second valve means including a safety valve ball for stopping fuel flow through the drain opening, said safety valve ball having a density less than water and greater than the fuel to move downwardly to close said drain opening when the separated water has been drained.

2. A fuel water separator, comprising a container having fuel entry port means, fuel exit port means, means for separating water from fuel inside said container and causing water to move downwardly while the low-density fuel moves upwardly, the means for separating water from fuel including means defining a circular path through which the fuel moves after entering said entry port, said path defining means including a radially outer wall against which the water is centrifugally forced, and valve means inside said container for preventing the separated water from remixing with the fuel, said valve means including an opening through which separated water drains downwardly and float means for closing said opening when the water collected raises to said opening.

3. A method of separating a high density liquid from a liquid mixture, comprising the steps of introducing the liquid mixture to a container, moving the liquid mixture in the container through a circular passageway having a radially outer wall to increase the velocity of the liquid mixture and to at least partially separate the high density liquid from the liquid mixture by centrifugally forcing the high density liquid against said radially outer wall, allowing separated particles of the high density liquid to move downwardly to the bottom of the container while the liquid mixture moves upwardly in the container, subsequently channeling the movement of the liquid mixture through a series of spaces to further cause the high density liquid to move downwardly to the bottom of the container while the liquid mixture continues to move upwardly, draining the separated high density liquid particles from each space to the bottom of the container, dispensing the liquid mixture absent the separated liquid particles from near the top of the container.

4. A fuel-water separator, comprising housing means, fuel inlet means for communicating a fuel-water mixture to be separated to said housing means, centrifugal path means located in said housing means and disposed downstream of said fuel inlet means and being operable to increase the velocity of the fuel-water mixture passing therethrough, velocity reducing space means in said housing means downstream of said centrifugal path means, said velocity reducing space means defining a flow path area substantially greater than the centrifugal path means so that the water entrained in the fuel-water mixture flowing from said centrifugal path means through said velocity reducing space means can settle downwardly, and at least one fuel-water separation space downstream of said velocity reducing space means, said fuel-separation space including means for separating fuel and water.

5. A fuel-water separator according to claim 4 wherein said centrifugal path means includes means defining openings for the escape of water spaced intermittently along the length thereof.

* * * * *